United States Patent [19]

Haimer et al.

[11] Patent Number: 5,365,673

[45] Date of Patent: Nov. 22, 1994

[54] MULTI-COORDINATE SENSING GAUGE

[75] Inventors: Franz Haimer, Weiherstrasse 21, W-8894 Igenhausen; Josef Gail, Aichach-Unterwittelsbach, both of Germany

[73] Assignee: Franz Haimer, Igenhausen, Germany

[21] Appl. No.: 84,236

[22] PCT Filed: Jan. 7, 1992

[86] PCT No.: PCT/EP92/00024

§ 371 Date: Oct. 21, 1993

§ 102(e) Date: Oct. 21, 1993

[87] PCT Pub. No.: WO92/12397

PCT Pub. Date: Jul. 23, 1992

[30] Foreign Application Priority Data

Jan. 8, 1991 [DE] Germany .............. 4100323

[51] Int. Cl.$^5$ .............................................. G01B 5/03
[52] U.S. Cl. .............................................. 33/559; 33/503
[58] Field of Search .............. 33/503, 556, 558, 559, 33/561

[56] References Cited

U.S. PATENT DOCUMENTS

| | | | |
|---|---|---|---|
| 3,079,693 | 3/1963 | Miner, Jr. | 33/556 |
| 3,520,063 | 7/1970 | Rethwish et al. | 33/558 |
| 3,660,906 | 5/1972 | Zimmerman | 33/174 |
| 4,516,327 | 5/1985 | Kanda et al. | 33/556 |
| 4,530,160 | 7/1985 | Feichtinger | 33/559 |

FOREIGN PATENT DOCUMENTS

| | | |
|---|---|---|
| 0128561 | 12/1984 | European Pat. Off. . |
| 0332575 | 9/1989 | European Pat. Off. . |
| 974218 | 9/1960 | Germany . |
| 2259091 | 6/1974 | Germany . |
| 2535249 | 2/1977 | Germany . |
| 1932010 | 2/1981 | Germany . |
| 3222103 | 12/1984 | Germany . |
| 3701730 | 8/1988 | Germany . |
| 56-148008 | 11/1981 | Japan .............. 33/559 |
| 59-30001 | 2/1984 | Japan .............. 33/556 |
| 5-223511 | 8/1993 | Japan .............. 33/559 |
| 1237813 | 6/1971 | United Kingdom . |
| 1271841 | 4/1972 | United Kingdom . |

*Primary Examiner*—William A. Cuchlinski, Jr.
*Assistant Examiner*—G. Bradley Bennett
*Attorney, Agent, or Firm*—Nikaido, Marmelstein, Murray & Oram

[57] ABSTRACT

The multi-coordinate sensing gauge of the invention comprises a sensing arm 7 displaceable relative to a housing 3 in the direction of a main coordinate axis 5 and guided on the housing 3 to be omnidirectionally pivotable about a first pivot point 19 located on the said main coordinate axis 5 by means of a first universal joint 13. A linkage arm 23 is coaxially connected to the sensing arm 7 and the end of said linkage arm which is away from the first universal joint 13 is omnidirectionally pivotable by a second universal joint 25 about a second pivot point 27 and is connected to a drive element 29. The drive element 29 in turn is guided on the housing 3 so as to be omnidirectionally pivotable about a third pivot point 33 by a third universal joint 31 displaceable along the main coordinate axis 5. The drive element 29 comprises an annular shoulder 51 facing away from the first pivot point 19 and enclosing the main coordinate axis 5 resting against an opposite annular shoulder 45, also enclosing the main coordinate axis 5, of a coupling 41 displaceable inside the housing 3. A dial indicator gaige 11 measures the excursion of the coupling 41. By suitably dimensioning the distances between the pivot points, the radial displacement of the sensing tip 9 of the sensing arm 7 on one hand and the axial displacement of the sensing tip 9 shall result in equally large displacements of the coupling 41.

12 Claims, 1 Drawing Sheet

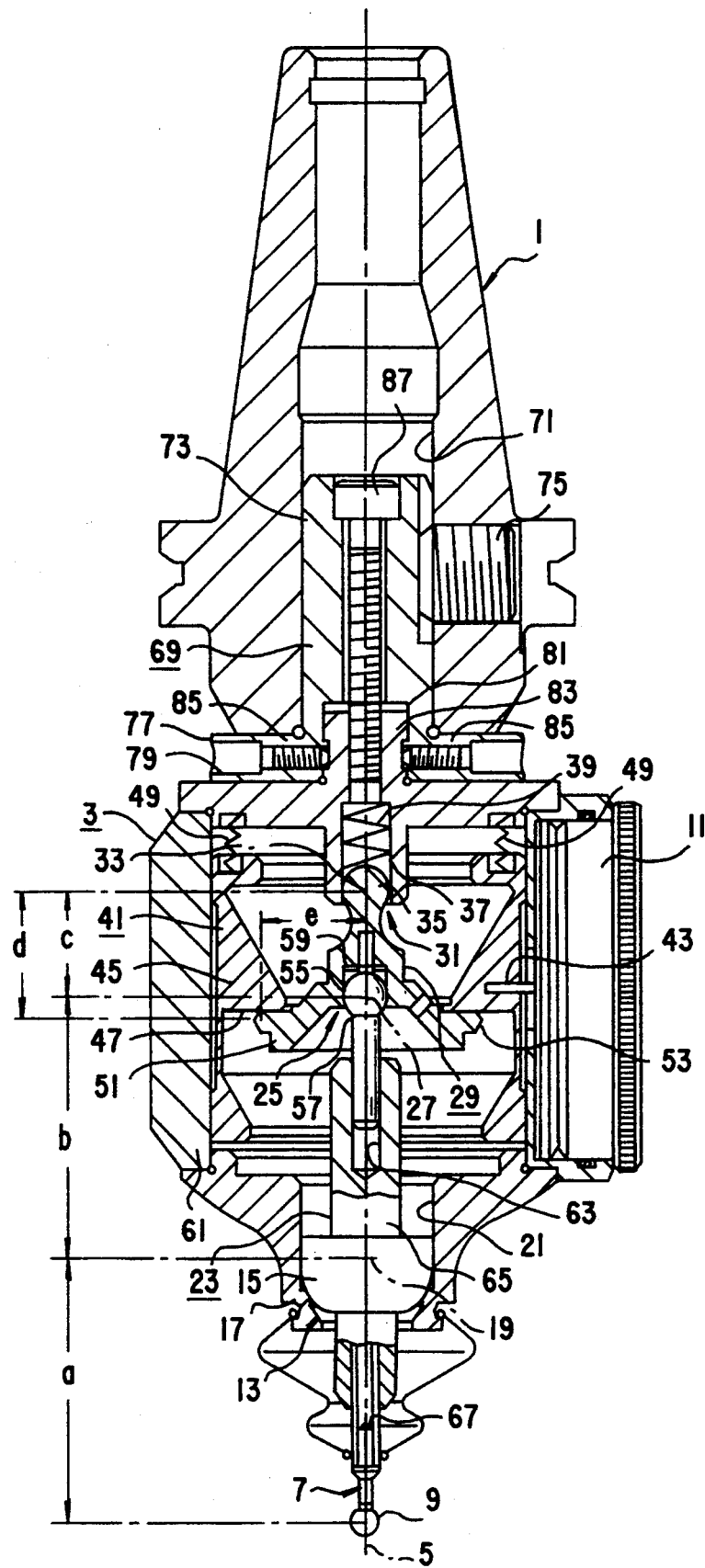

MULTI-COORDINATE SENSING GAUGE

The invention concerns a multi-coordinate sensing gauge, comprising a housing, a sensor arm elastically prestressed into a rest position and displaceable in the direction of a main coordinate axis relative to the housing by means of a first universal joint being guided on the housing omnidirectionally pivotable about a first pivot point located on the main coordinate axis, a sensing tip of said arm being located in its rest position on the main coordinate axis, further comprising a coupling displaceably guided in the housing in the direction of the main coordinate axis, a linkage arm which in relation to the first pivot point extends opposite and away from said sensing arm, the end of the linkage arm which is far from the first pivot point being hinged in such manner on the coupling so that the linkage arm shall drive the coupling in the direction of the main coordinate axis both when the sensing arm is moving in the direction of the main coordinate axis and when the sensing arm is displaced out of its rest position about the first pivot point, and a measurement device detecting the coupling's position relative to the housing.

A multi-coordinate sensing gauge of this kind is known from the German patent document A 37 01 730. This sensing gauge allows measuring distances both in the direction of a main coordinate axis and also omnidirectionally radially to the main coordinate axis, with respect to a rest position of the sensing arm of this gauge. For that purpose the sensing arm is mounted by a ball-and-socket joint in the housing to be omnidirectionally pivotable, the ball of the ball-and-socket joint is additionally displaceable in its socket in the direction of the main coordinate axis. A linkage arm projects from the ball and is opposite the sensing arm and provides support for a coupling displaceably guided inside the housing along the main coordinate axis. The coupling comprises an approximately conical recess entered by the linkage arm and is connected to a dial indicator gauge the displacement in the direction of the main coordinate axis of the coupling relative to the housing. The shape of the recess in the coupling is selected in such a way that the calibration graduation of the dial indicator gauge represents both the displacement of the sensing tip in the direction of the main coordinate axis and the displacement transverse thereto. A spring prestressing the coupling toward the ball-and-socket joint ensures that the sensing arm shall automatically return to a rest position wherein its sensing tip shall lie on the main coordinate axis.

In the known test equipment, the recess in the coupling receiving the end of the linkage arm must have the shape of a paraboloid of revolution. However such a shape can be achieved with accuracy only at comparatively high cost. Moreover, on account of the paraboloid shape, the restoring forces acting on the sensing arm decrease in the direction of the rest position, as a result of which this rest position is only poorly reproducible.

The object of the invention is to create a multi-coordinate sensing gauge consisting of easily manufactured parts and evincing a stable rest position for its sensing arm.

Based on the initially discussed multi-coordinate gauge, this problem is solved by the invention in that the end of the linkage arm which is far from the first pivot point is connected by a second universal joint to a drive element in order to be omnidirectionally pivotable about a second pivot point, said drive element in turn being guided on the housing by a third universal joint to be omnidirectionally pivotable about a third pivot point displaceable along the main coordinate axis, and in that the drive element comprises an annular shoulder enclosing the main coordinate axis and pointing away from the first pivot point and resting against an oppositely pointing annular shoulder of the coupling also enclosing the main coordinate axis. In such a design the annular shoulders when in the rest position support each other at a relatively large distance from the main coordinate axis. A fairly large restoring torque acts on the drive element and keeps the linkage arm and thereby the sensing arm stably in the rest position wherein the sensing tip lies on the main coordinate axis. If the sensing tip is driven in the direction of the main coordinate axis, then the drive element will move purely in translation along the main coordinate axis. The coupling displacements monitored by the measuring device thereby is equal to the displacement of the sensing tip. When, starting from the rest position of the sensing arm, the sensing tip is displaced transversely to the main coordinate axis, then the drive element will tip about the third pivot point —which is displaceable along the main coordinate axis for purposes of path compensation—of the third universal joint. At the same time the annular shoulder of the drive element is tipped toward the annular shoulder of the coupling, whereby the coupling is displaced along the main coordinate axis, and this displacement is sensed by the measuring device. By appropriately selecting the dimensions of the drive element, the displacement of the coupling in the direction of the main coordinate axis will be accurately equal to the displacement of the sensing tip transversely to the main coordinate axis.

The sensing gauge of the invention is made of components of simple manufacture. In particular no curved inside surfaces need be made of which the manufacturing tolerances would affect the gauge's accuracy. Where spatially curved surfaces are required, these are convex, for instance spherical surfaces provided of the universal joints preferably designed as ball-and-socket joints or they concern rounding a rest blade such as is appropriately provided along the peripheral edge of the annular shoulder of the drive element. In particular it is the coupling which is free of complex inner surfaces that would affect accuracy. In a preferred embodiment mode, the annular shoulder of the coupling is a plane rest-surface running perpendicularly to the main coordinate axis.

The measurement error for distance measurements transverse to the main coordinate axis shall be especially small when the distance of the third pivot point from the plane of a tilting circle determined by the annular shoulder of the drive element is larger than the distance between the third and the second pivots points. In this case the tangents to this tilting circle form the pivot axes about which the drive element resting against the coupling annular shoulder pivots when tilting relative to the coupling.

Accuracy of measurement will be enhanced further when the tilting circle defined by the peripheral edge of the drive-element annular shoulder and by the straight line between the second and third pivot points is of a radius substantially equal to the distance between the third and second pivot points. It is clear that the peripheral edge can be rounded about the tilting circle to avert wear-damage to the coupling's annular shoulder.

A further step enhancing accuracy of measurement is that the distance between the sensing tip of the sensing arm and the first pivot point in its rest position is equal to the distance between the second and first pivot points. It must be borne in mind in this regard that the sensing-arm's sensing tip not only denotes a geometric tip, but that the sensing-arm sensing tip also may be provided with a ball-head without thereby affecting the measurement procedure, where the center of said ball-head would constitute the sensing tip.

To compensate for manufacturing tolerances of the gauge components, a preferred design provides that the spacing between the second and first pivot points and-/or that between the second and third pivot points be adjustable. A preferred embodiment mode for this purpose fits the linkage arm with two arm-parts guided against one another by telescoping surfaces and in particular affixed to each other by bonding. In the manufacture of the sensing gauge, the two arm-parts—which according to the sensing gauge design are meant to accurately define the spacing between two pivot points—are adjusted relative to one another by a precision block without a need for mechanical after-working for instance the balls or sockets of the universal joints.

Again the accurate spacing between the third and second pivot points can be adjusted without post-finishing of the drive element when the second universal joint is a ball joint of which the cylindrical socket receiving a ball seats at least one spacer washer. The spacer washer is easily exchanged for adjustment purposes or can be worked by grinding to a desired thickness.

The sensing-gauge mechanism may be irreparably damaged if the gauge is handled carelessly. To minimize any damage, a preferred embodiment mode provides that the sensing arm is fitted with a rated rupture site especially in the form of a ceramic element inserted between the first universal joint and the sensing tip. While in the event of improper handling the sensing tip of the sensing arm does break off, larger damages on the other hand will be avoided. Repairs are restricted to exchanging a few parts.

As a rule multi-coordinate sensing gauges are fitted with a clamping shaft by means of which for instance they can be clamped into the tool seat of a machine tool. Accurate measurements require that the axis of the clamping shaft illustratively in the form of a steep-angle taper be congruent with the main coordinate axis defined by the sensing gauge. In a preferred embodiment mode of the invention, which furthermore is also advantageous for sensing gauges other than the above discussed one, the housing and the clamping shaft comprise mutually arrayed rest surfaces perpendicular to the main coordinate axis and are affixed to each other by at least one clamping screw extending in the direction of the main coordinate axis. The housing or the clamping shaft bears a centering pin centered on the main coordinate axis of this part and entering with radial play a centering aperture of the other part. At least three adjustment screws are arrayed radially to the main coordinate axis on the periphery of the centering aperture. While the rest surfaces at the housing and the clamping shaft ensure the axes shall be parallel, the adjustment screws allow compensating alignment errors.

The centering aperture or the centering pin may be present directly at the clamping shaft or at the housing.

In a preferred embodiment mode of the invention, the centering pin is present at the housing and the centering aperture in an adapter snugly fitted in a steep-angle taper. This allows exchanging the steep-angle taper without altering the adjustment.

An illustrative embodiment of the invention is elucidated below in relation to a drawing. The drawing is an axial, longitudinal section of a multi-coordinate sensing gauge.

The multi-coordinate sensing gauge fitted with a steep-angle taper 1 for mounting to a machine tool or a measuring device comprises a housing 3 from which projects a sensing arm 7 with an axis congruent with the main coordinate axis 5 defined by the steep-angle taper 1. The sensing arm 7 ends in a spherical sensing tip 9 and is displaceable from the rest position shown in the drawing and can be moved transversely to the main coordinate axis 5. A dial indicator gauge 11 mounted on the housing 3 displays, on a uniform scale, the magnitude of axial or radial displacement.

The sensing arm 7 is supported in omnidirectionally pivotable manner inside the housing 3 by a first ball-and-socket joint 13. The ball-and-socket joint 13 comprises a ball segment 15 rigidly affixed to the sensing arm 7 and is supported in omnidirectionally pivoting manner about a pivot point 19 in an approximately blade-shaped ball socket 17 tapering toward the sensing tip 9. The ball socket 17 continues in the direction of the main coordinate axis 5 and away from the sensing tip 9 in the form of a cylindrical guide aperture 21 and thereby allows axially displacing the sensing arm 7 in the direction of the main coordinate axis 5.

The sensing arm 7 extends into the housing 3 where it forms a linkage arm 23 which by its end away from the ball-and-socket joint 13 is coupled by a second ball-and-socket joint 25 to a drive element 29 so as to be omnidirectionally pivotable about a pivot point 27. The drive element 29 in turn is guided at the housing 3 in a third ball-and-socket joint 31 to be omnidirectionally pivotable about a pivot point 33 located on the main coordinate axis 5. The ball-and-socket joint 31 comprises a hinging ball 35 integral with the drive element 29 and seated in a cylindrical socket aperture 37 concentric with the main coordinate axis 5. A compression spring 39 present in the aperture 37 stresses the drive element 29 against the linkage arm 23 and thereby compensates any play of the ball-and-socket joints 25 and 13.

A substantially sleeve-shaped coupling 41 is movably guided in snugly fitting matter and coaxially with the main coordinate axis 5 inside the housing 3. The coupling 41 is linked by a pin 43 to the indicator dial gauge 11 which thereby senses the displacement of the coupling 41 relative to the housing 3. The coupling 41 comprises a radially inward projecting annular shoulder 45 with a plane rest surface 47 extending perpendicularly to the main coordinate axis 5 and pointing toward the sensing tip 9. Several peripherally spaced compression springs 49 between the housing 3 and the coupling 41 stress the rest surface 47 of the annular shoulder 45 against an annular shoulder 51 of the drive element 29 which in this zone is saucer-shaped, said annular shoulder 51 pointing away from the sensing tip 9. The springs 49 apply a comparatively high restoring force through the coupling 41 to the drive element 29 and thereby the pivot points of the ball-and-socket joints 25 and 31 shall stably rest on the main coordinate axis 5 when in the rest positions.

If the sensing tip 9 is driven out of the rest position shown in the drawing in the direction of the main coordinate axis 5, then the drive element 29 transmits through the entire circumference of its annular shoulder 51 the force of displacement to the coupling 41 and the indicator dial gauge 11 directly detects the displacement of the sensing tip 9.

When the sensing tip 9 is displaced transversely to the main coordinate axis, the pivoting motion of the sensing arm 7 is transmitted through the linkage arm 23 to the drive element 29. The drive element 29 pivots about the pivot point 33 which simultaneously carries out a length-compensatory motion toward the pivot point 19 of the ball-and-socket joint 13, said pivot point 19 being stationary relative to the housing 3. On account of the said pivoting motion, the annular shoulder 51 of the drive element 29 tilts about a virtual pivot-axis extending tangentially to a tilting circle of which the plane is perpendicular to the straight line connecting the pivot points 27 and 33 of the ball-and-socket joints 25 and 31 and of which the drawing plane intersecting points are shown in the drawing at 53. The peripheral edge of the annular shoulder 51 is rounded in cross-sectionally toroidal mariner along the tilting circle 53 in order to prevent abrasion of the mutual rest surfaces on account of said tilting motion. The tilting motion of the drive element 29 caused by the radial displacement of the sensing tip 9 results in an equally large axial displacement of the coupling 41 which again is detected by the dial indicator gauge 11. Accordingly, using the same calibration, the dial indicator gauge 11 is able to measure the displacement of the sensing tip 9 both in the axial and in the radial direction.

In order to minimize the display error of the dial indicator gauge 11 in the case of radial displacement of the sensing tip 9 in relation to an equally large axial displacement, the distance "a" between the pivot point 19 and the sensing tip 9 is made equal to the distance "b" between the pivot point 27 and the pivot point 19. Moreover the distance "c" between the pivot point 33 and the pivot point 27 is selected to be equal to the radius "e" of the tilting circle, and the distance "d" between the pivot point 33 and the phase of the tilting circle is made larger than the distance "c". By optimizing the distance "c" and "d" in relation to the distance "b", the discrepancy in displays for radial and axial displacements of the sensing tip 9 can be reduced down to values which are negligibly small in relation to the measurement accuracy of the dial indicator gauge 11.

The distances "a", "b" and "c" are determined by the centers of spherical ends. In order to compensate nevertheless the tolerances regarding the distances "a" and "b" as well those of the distance "c" without costly processing of the spherical ends, the linkage arm 23 is designed as telescoping arm and the ball-and-socket joint 25 comprises a cylindrical socket 55 at the drive element 29, said socket 55 receiving a spacer washer 59 of appropriate thickness to adjust the position of the hinging ball 57 of the ball-and-socket joint 25. The spacer washer 59 allows adjusting the distance "c".

The hinging ball 57 of the ball-and-socket joint 25 is held by a pin 61 to adjust the distance "b", said pin 61 being held in turn in a central borehole 63 of a shank 65 bearing the hinging ball 15 and integrally merging into the sensing arm 7. The pin 61 is displaceable during installation in the borehole 63 and thereby, for instance using an adjustment block, the distance between the hinging ball 57 and the sensing tip 9 can be adjusted before the pin 61 shall be affixed, for instance by bonding, to the shank 65.

To preclude damages to the mechanism of the gauge in the event of improper handling, the sensing tip 9 is mounted by a ceramic tube 67 to the shank 65. The ceramic tube 67 forms a rated rupture site protecting the remaining transmitting pans of the gauge from overloads.

The axis of the steep-angle taper 1 must be coaxial with the main coordinate axis 5 determined by the remaining components of the gauge. In order to allow compensating alignment errors, the housing 3 is affixed by an adapter 69 to the steep-angle taper 1, where said adapter 69 allows adjusting the main coordinate axis 5 of the housing 3 being parallel to the axis of the steep-angle taper 1. The adapter 69 comprises a shank 73 seated in snugly fitting manner in a central bore 71 of the steep-angle taper 1 and is mounted in exchangeable manner by a clamping screw 75 on the shank. The shank 73 comprises an annular flange 77 between the steep-angle taper 1 and the housing 3, said flange evincing a precisely perpendicular, plane rest surface 79 for the housing 3. A centering aperture 81 is countersunk into the rest surface 79 and this aperture is entered, with radial play, by a centering pin 83 projecting from the housing 3. At least three radial adjustment screws 85 distributed over the circumference of the annular flange 77 allow radially adjusting the housing 3 guided in displaceable manner against the rest surface 79. A central tightening screw 87 keeps the housing 3 against the adapter 69. In order to radially adjust the housing 3 relative to the steep-angle taper 1, the screw 87 first is tightened slightly to stress the housing 3 somewhat against the rest surface 79. Following adjustment, the adjustment screws 85 keep the housing in the desired position until the screw 87 has been fully tightened from the end of the steep-angle taper 1 which is away from the housing.

We claim:

1. A multi-coordinate sensing gauge comprising:

a housing (3), a sensing arm (7), elastically prestressed into a rest position, and displaceable in the direction of a main coordinate axis (5) relative to the housing (3), the sensing arm (7) by means of a first universal joint (13) being guided on the housing (3) omnidirectionally pivotable about a first pivot point (19) located on the main coordinate axis (5), a sensing tip (9) of said sensing arm (7) being located on the main coordinate axis (5) when in the rest position, a coupling (41) displaceably guided inside the housing (3) in the direction of the main coordinate axis (5), a linkage arm (23) which in relation to the first pivot point (19) extends opposite and away from the sensing arm (7) and of which the end far from the first pivot point is hinging in such manner on the coupling (41) that the linkage arm (23) drives the coupling (41) both when the sensing arm (7) is displaced in the direction of the main coordinate axis (5) and when the sensing arm (7) is displaced from its rest position about the first pivot point (19), in the direction of the main coordinate axis (5) and a measuring device (11) detecting the position of the coupling (41) relative to the housing (3), characterized in that the end of the linkage arm (23) which is far from the first pivot point (19) is omnidirectionally pivotably connected by a second universal joint (25) in order to pivot about a second pivot point (27) to a drive element (29) which in turn is guided in omnidirectionally pivotable manner on the housing (3) by a third universal joint (31) about a third pivot point (33) displaceable along the main coordinate axis (5), in that the drive element (29) comprises an annular shoulder (51) enclosing the main coordinate axis (5) and pointing away from the first pivot point (19), said shoulder (51) resting against an oppositely directed annular shoulder (45) of the coupling and also enclosing the main coordinate axis (5), and in that spring means (49) are provided to compress the mutually facing annular shoulders (45,51) against each other.

2. Sensing gauge defined in claim 1, characterized in that the annular shoulder (45) of the coupling (41) comprises a plane rest surface (47) which is perpendicular to the main coordinate axis (5).

3. Sensing gauge defined in claim 1, characterized in that the annular shoulder (51) of the drive element (29) comprises a rounded rest-blade support.

4. Sensing gauge defined in claim 1, characterized in that the distance (d) between the third pivot point (33) and the plane of a tilting circle (53) determined by the annular shoulder 51 of the drive element (29) is larger than the distance (c) between the third pivot point (33) and the second pivot point (27).

5. Sensing gauge defined in claim 1, characterized in that the annular shoulder (51) of the drive element (29) comprises a peripheral edge defining a tilting circle (53) enclosing the straight line connecting the second pivot point (27) and the third pivot point (33), the radius (e) of said circle (53) being essentially equal to the distance.

6. Sensing gauge defined in claim 1, characterized in that the distance "a" between the sensing tip (9) of the sensing arm (7) and the first pivot point (19) for the rest position is equal to the distance "b" between the second pivot point (27) and the first pivot point (19).

7. Sensing gauge defined in claim 1, characterized in that the distances "b", "c" between the second pivot point (27) and the first pivot point (19) or the third pivot point (33) are adjustable.

8. Sensing gauge defined in claim 7, characterized in that the linkage arm comprises two arm parts (61), (65) guided by telescoping guide surfaces against each other and being connected in particular by bonding to each other.

9. Sensing gauge defined in claim 7, characterized in that the second universal joint (25) is a ball-and-socket joint of which the cylindrical socket (55) receiving a hinging ball (57) is present at the drive element (29) and contains at least one spacer washer.

10. Sensing gauge defined in claim 1, characterized in that the sensing arm (7) contains a rated rupture site in particular in the form of a ceramic component (67) inserted between the first universal joint (13) and the sensing tip (9).

11. A multi-coordinate sensing gauge, comprising
a housing (3),
a sensing arm (7) guided on the housing (3) and elastically prestressed in one direction and displaceable in the direction of a main coordinate axis (5) relative to the housing (3) and being omnidirectionally pivotable by a universal joint (13) about a pivot point (19) located on the main coordinate axis (5), the sensing tip (9) of said sensing arm (7) when in its rest position being located on the main coordinate axis (5),
a measurement device (11) linked to the sensing arm (7) and detecting the deviation of the sensing tip (9) from the rest position both in the direction of the main coordinate axis (5) and perpendicular thereto, and
a clamping shaft (1) supporting the housing (3), characterized in that the housing (3) and the clamping shaft (1) comprise mutually associated rest surfaces (79) perpendicular to the main coordinate axis (5) and affixed to each other by at least one clamping screw (87) extending in the direction of the main coordinate axis (5), further in that the housing (3) or the clamping shaft (1) bears a centering pin (83) which is centrally located in this part relative to the main coordinate axis (5) and which enters with radial play a centering aperture (81) of the other part, and in that at least three adjustment screws (85) radially adjustable relative to the main coordinate axis (5) are spaced along the circumference of the centering aperture (81).

12. Sensing gauge defined in claim 11, characterized in that the centering pin (83) is present at the housing (3) and the centering aperture (81) is present in an adapter (69) snugly fitted in a steep-angle taper (1).

* * * * *